(12) United States Patent
Schmidt et al.

(10) Patent No.: US 6,287,639 B1
(45) Date of Patent: Sep. 11, 2001

(54) COMPOSITE MATERIALS

(75) Inventors: Helmut Schmidt, Saarbruecken-Guedingen; Martin Menning, Quierschied; Gerhard Jonschker, Spiesen-Elversberg, all of (DE)

(73) Assignee: Institut für Neue Materialien gemeinnützige GmbH, Saarbrücken (DE)

( * ) Notice: Subject to any disclaimer, the term of this patent is extended or adjusted under 35 U.S.C. 154(b) by 0 days.

(21) Appl. No.: 09/297,571
(22) PCT Filed: Nov. 14, 1997
(86) PCT No.: PCT/EP97/06370
§ 371 Date: May 3, 1999
§ 102(e) Date: May 3, 1999
(87) PCT Pub. No.: WO98/22648
PCT Pub. Date: May 28, 1998

(30) Foreign Application Priority Data

Nov. 15, 1996 (DE) .............................................. 196 47 368

(51) Int. Cl.$^7$ ....................................................... B05D 3/02
(52) U.S. Cl. .................. 427/387; 427/388.1; 427/388.4; 427/389.9
(58) Field of Search ................................ 427/387, 388.1, 427/388.4, 389.9

(56) References Cited

FOREIGN PATENT DOCUMENTS

4417405 * 11/1995 (DE) .

OTHER PUBLICATIONS

Kasemann et al, Mater. Res. Soc.Symp. Proc. (1994), 346, pp. 915–21.*

Schmidt et al, ACS Symp. Ser. (1995), 585, pp. 331–47.*

* cited by examiner

*Primary Examiner*—Erma Cameron
(74) *Attorney, Agent, or Firm*—Heller Ehrman White & McAuliffe LLP

(57) ABSTRACT

A composite material is described which is characterized by a substrate and by a nanocomposite which is in functional contact with the substrate and is obtainable by surface modification of a) colloidal inorganic particles with
b) one or more silanes of the general formula (I)

$$R_x\text{—Si—}A_{4-x} \qquad (I)$$

where the radicals A are identical or different and are hydroxyl groups or groups which can be removed hydrolytically, except methoxy, the radicals R are identical or different and are groups which cannot be removed hydrolytically and x is 0, 1, 2 or 3, where $x \geq 1$ in at least 50 mol % of the silanes;

under the conditions of the sol-gel process with a below-stoichiometric amount of water, based on the hydrolysable groups which are present, with formation of a nanocomposite sol, and further hydrolysis and condensation of the nanocomposite sol, if desired, before it is brought into contact with the substrate, followed by curing, said substrate not being a glass or mineral fiber or a vegetable material.

21 Claims, No Drawings

COMPOSITE MATERIALS

The invention relates to composite materials characterized by a substrate and by a nanocomposite which is in functional contact with the substrate and is obtainable by surface modification of a) colloidal inorganic particles with
b) one or more silanes of the general formula (I)

$$R_x\text{—Si—}A_{4-x} \qquad (I)$$

where the radicals A are identical or different and are hydroxyl groups or groups which can be removed hydrolytically, except methoxy, the radicals R are identical or different and are groups which cannot be removed hydrolytically and x is 0, 1, 2 or 3, where $x \geq 1$ in at least 50 mol % of the silanes;

under the conditions of the sol-gel process with a substoichiometric amount of water, based on the hydrolysable groups which are present, with formation of a nanocomposite sol, and further hydrolysis and condensation of the nanocomposite sol, if desired, before it is brought into contact with the substrate, followed by curing, said substrate not being a glass or mineral fibre or a vegetable material.

The substrate may be of very different physical forms, and be, for example, particulate, flocculent, fibrous, strip-shaped, plate-shaped, foil-shaped, sheet-shaped or block-shaped, or have a layered structure, or be a shaped article of any desired shape. The term "particulate" includes powders, flours, granules, chips, slivers, globules, beads and generally any particle with a regular or irregular shape.

The nanocomposite, too, may be distributed in many different forms. It may, for example, cover the substrate entirely or partially, as a continuous coating or covering, or may be similar to a laminate between a number of substrates. Specific examples of composite materials of this type are fibre composites based on aramids or carbon fibres, metal substrates provided with high-temperature anti-corrosion layers, fibres, twines, yarns and semifinished products, such as wovens, knits, braids, non-wovens and felts, provided with a thermally stable impregnation, or shaped articles of glass or ceramic which are bonded (laminated) to a metal (e.g. aluminium) foil via the nanocomposite. The nanocomposite can also be employed as stiffening or reinforcement, diffusion barrier layer, extraction barrier layer, oxidation protection layer, electrical insulation layer or for levelling.

The nanocomposite can alternatively form discontinuous or punctiform contacts between a number of substrates and, for example, act as a matrix in bonding a particulate, flocculent or fibrous substrate, as for example in insulating materials.

Suitable substrate materials for the novel composite materials are many different inorganic or organic, natural or synthetic materials.

Examples of suitable substrate materials are non-metals, such as boron and silicon, and metals, such as iron, chromium, copper, nickel, aluminium, titanium, tin, zinc and silver, and corresponding alloys (e.g. brass, steel or bronze) in the form of powders, fibres, films, textiles, sheets and shaped articles; glass materials in the form of powders, flakes, sheets or shaped articles; ceramic materials in the form of powders, fibres, textiles, non-wovens, flakes, sheets and shaped articles; carbon (carbon black, graphite, fullerenes) in the form of powders, fibres, layers, sheets and shaped articles; oxides, such as $SiO_2$, $Al_2O_3$, $Fe_2O_3$, $Fe_3O_4$, $Cr_2O_3$, $CuO$, $Cu_2O$, $In_2O_3$, $Mn_2O_3$, $PbO$, $PdO$, $SnO_2$, $TiO_2$, $ZnO$ and $ZrO_2$, nitrides, such as $BN$, $Si_3N_4$ and $TiN$, carbides, such as $SiC$, $TiC$ and $B_4C$, silicides, non-stoichiometric compounds (e.g. $SiO_xC_yN_z$), composites and hybrid materials in the form of powders and fibres; preferably heat-resistant plastics, such as polyolefins, fluoropolymers, such as Teflon, homo- and copolymers of vinyl halides or vinyl esters, polycarbonates, polyesters, polyurethanes, aramids, polyamides, acrylic resins, silicones and ormocers in the form of fibres, granules, films, felts, textiles, non-wovens, sheets and shaped articles; natural fibres and materials of animal origin, such as wool, fur or leather; and minerals, such as montmorillonites, bentonites, mica, vermiculite, perlite, ferrite, spinels, e.g. magnetite or copper chromium spinel, barytes, fluorspar, asbestos, talc, aerogels, sands and clays.

The term fibrous substrates is taken to mean either individual fibres, including hollow fibres and whiskers, or corresponding fibre bundles, threads, ropes, twines and yarns or semifinished products, such as wovens, knits, braids, textiles, non-wovens, felts, webs and mats. Concrete examples of these are carbon fibres, fabrics made from cotton and synthetics, metal fibres and metal fabrics.

The nanocomposite employed according to the invention is prepared by surface modification of colloidal inorganic particles (a) with one or more silanes (b), if desired in the presence of other additives (c) under the conditions of the sol-gel process.

Details of the sol-gel process are described in C. J. Brinker, G. W. Scherer: "Sol-Gel Science—The Physics and Chemistry of Sol-Gel-Processing", Academic Press, Boston, San Diego, New York, Sydney (1990) and in DE 1941191, DE 3719339, DE 4020316 and DE 4217432.

Here, specific examples of the silanes (b) which can be employed according to the invention and of their radicals A which are hydrolytically removable and their radicals R which are not hydrolytically removable are given.

Preferred examples of groups A which are removable hydrolytically are hydrogen, halogen (F, Cl, Br and I, in particular Cl and Br), alkoxy (in particular $C_{2-4}$-alkoxy, such as ethoxy, n-propoxy, isopropoxy and butoxy), aryloxy (in particular $C_{6-10}$-aryloxy, such as phenoxy), alkaryloxy (e.g. benzyloxy), acyloxy (in particular $C_{1-4}$-acyloxy, such as acetoxy and propionyloxy) and alkylcarbonyl (e.g. acetyl). Radicals A which are likewise suitable are amino groups (e.g. mono- or dialkyl-, -aryl- and -aralkylamino groups having the abovementioned alkyl, aryl and aralkyl radicals), amide groups (e.g. benzamido) and aldoxime or ketoxime groups. Two or three radicals A may also together form a moiety which complexes the Si atom, as for example in Si-polyol complexes derived from glycol, glycerol or pyrocatechol. Particularly preferred radicals A are $C_{2-4}$-alkoxy groups, in particular ethoxy. Methoxy groups are less suitable for the purposes of the invention, since they have an excessively high reactivity (short processing time of the nanocomposite sol) and can give nanocomposites and/or composite materials with insufficient flexibility.

The abovementioned hydrolysable groups A may, if desired, carry one or more usual substituents, for example halogen or alkoxy.

The radicals R which are not hydrolytically removable are preferably selected from the group consisting of alkyl (in particular. $C_{1-4}$-alkyl, such as methyl, ethyl, propyl and butyl), alkenyl (in particular $C_{2-4}$-alkenyl, such as vinyl, 1-propenyl, 2-propenyl and butenyl), alkynyl (in particular $C_{2-4}$-alkynyl, such as acetylenyl and propargyl), aryl (in particular $C_{6-10}$-aryl, such as phenyl and naphthyl) and the corresponding alkaryl and arylalkyl groups. These groups may also, if desired, have one or more usual substituents, for example halogen, alkoxy, hydroxy, amino or epoxide groups.

The abovementioned alkyl, alkenyl and alkynyl groups include the corresponding cyclic radicals, such as cyclopropyl, cyclopentyl and cyclohexyl.

Particularly preferred radicals R are substituted or unsubstituted $C_{1-4}$-alkyl groups, in particular methyl and ethyl, and substituted or unsubstituted $C_{6-10}$-alkyl groups, in particular phenyl.

It is also preferable that x in the above formula (I) is 0, 1 or 2, particularly preferably 0 or 1. It is also preferable if x=1 in at least 60 mol %, in particular at least 70 mol %, of the silanes of the formula (I). In particular cases, it may be even more favourable if x=1 in more than 80 mol %, or even more than 90 mol % (e.g. 100 mol %), of the silanes of the formula (I).

The novel composite materials may be prepared, for example, from pure methyltriethoxysilane (MTEOS) or from mixtures of MTEOS and tetraethoxysilane (TEOS), as component (b).

The use of silanes with one or more groups R which are substituted is advisable in particular where special properties are to be given to the composite material. For example, the introduction of fluorine atoms (e.g. in the form of substituted aliphatic (in particular alkyl) radicals) can give a composite material which has water-, dirt-, dust- and oil-repellent properties. Concrete examples of silanes of the general formula (I) are compounds of the following formulae:

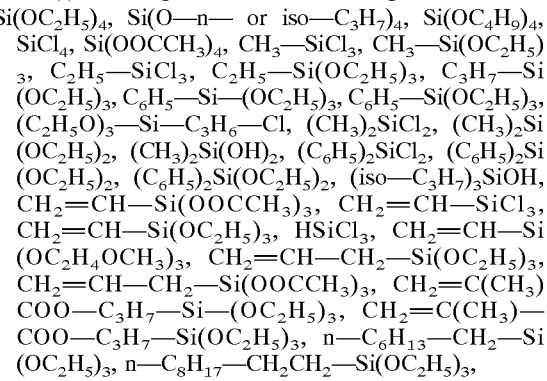

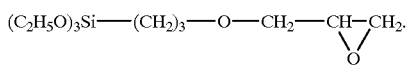

These silanes can be prepared by known methods; cf. W. Noll, "Chemie und Technologie der Silicone" [Chemistry and Technology of the Silicones], Verlag Chemie GmbH, Weinheim/Bergstraße, Germany (1968).

Based on the abovementioned components (a), (b) and (c), the proportion of component (b) is usually from 20 to 95% by weight, preferably from 40 to 90% by weight, and particularly preferably from 70 to 90% by weight, expressed as polysiloxane of the formula: $R_xSiO_{(2-0.5x)}$ which is formed in the condensation.

The silanes of the general formula (I) used according to the invention may be employed wholly or partially in the form of precondensates, i.e. compounds produced by partial hydrolysis of the silanes of the formula (I), either alone or in a mixture with other hydrolysable compounds. Such oligomers, preferably soluble in the reaction medium, may be straight-chain or cyclic low-molecular-weight partial condensates (polyorgano-siloxanes) having a degree of condensation of e.g. from about 2 to 100, in particular from about 2 to 6.

The amount of water employed for hydrolysis and condensation of the silanes of the formula (I) is preferably from 0.1 to 0.9 mol, and particularly preferably from 0.25 to 0.75 mol, of water per mole of the hydrolysable groups which are present. Particularly good results are often achieved with from 0.35 to 0.45 mol of water per mole of the hydrolysable groups which are present.

Specific examples of colloidal inorganic particles (a) are sols and powders dispersible at the nano level (particle size preferably up to 300 nm, in particular up to 100 nm and particularly preferably up to 50 nm) of $SiO_2$, $TiO_2$, $ZrO_2$, $Al_2O_3$, $Y_2O_3$, $CeO_2$, $SnO_2$, $ZnO$, iron oxides or carbon (carbon black and graphite), in particular of $SiO_2$.

The proportion of component (a), based on the components (a), (b) and (c), is usually from 5 to 60% by weight, preferably from 10 to 40% by weight, and particularly preferably from 10 to 20% by weight.

For preparing the nanocomposite, other additives in amounts of up to 20% by weight, preferably up to 10% by weight, and in particular up to 5% by weight, may be employed as optional components (c); examples are curing catalysts, such as metal salts and metal alkoxides (e.g. aluminium alkoxides, titanium alkoxides or zirconium alkoxides), organic binders, such as polyvinyl alcohol, polyvinyl acetate, starch, polyethylene glycol and gum arabic, pigments, dyes, flame retardants, compounds of glass-forming elements (e.g. boric acid, boric acid esters, sodium methoxide, potassium acetate, aluminium sec-butoxide, etc.), anti-corrosion agents and coating aids. According to the invention, the use of binders is less preferred.

The hydrolysis and condensation is carried out under sol-gel conditions in the presence of acid condensation catalysts (e.g. hydrochloric acid) at a pH of preferably from 1 to 2, until a viscous sol is produced.

It is preferable if no additional solvent is used besides the solvent produced in the hydrolysis of the alkoxy groups. If desired, however, alcoholic solvents, such as ethanol, or other polar, protic or aprotic solvents, such as tetrahydrofuran, dioxane, dimethylformamide or butyl glycol, for example, may be employed.

In order to achieve a favourable sol particle morphology and sol viscosity, the resultant nanocomposite sol is preferably subjected to a special post-reaction step in which the reaction mixture is heated to temperatures of from 40 to 120° C. over a period of from a number of hours to a number of days. Special preference is given to storage for one day at room temperature or heating for a number of hours at from 60 to 80° C. This gives a nanocomposite sol with a viscosity of preferably from 5 to 500 mPas, particularly preferably from 10 to 50 mPas. The viscosity of the sol can also, of course, be adjusted to suitable values for the specific application by adding solvents or removing side-products of the reaction (e.g. alcohols). The post-reaction step may preferably also be coupled with a reduction of the solvent content.

The proportion by weight of the nanocomposite in the composite material is preferably from 0.1 to 80% by weight, in particular from 1 to 40% by weight, and particularly preferably from 1 to 20% by weight.

The substrate and the nanocomposite or nanocomposite sol are combined after at least initial hydrolysis of component (b) and in any case before final curing. Before it is brought into contact with the substrate, the nanocomposite sol is preferably activated by feeding in a further amount of water.

The contact can be brought about by any means known to the person skilled in the art and deemed to be useful for the particular case, e.g. by simple mixing of substrate and nanocomposite sol, dipping, spraying or showering, knife- or spin-coating, pouring, spreading, brushing, etc., into the or with the nanocomposite sol. In order to improve the adhesion between substrate and nanocomposite, it may be advantageous in many cases to subject the substrate, before contact with the nanocomposite or its precursor, to a conventional surface pretreatment, e.g. corona discharge, degreasing, treatment with primers, such as aminosilanes, epoxy silanes, sizes made from starch or silicones, complexing agents, surfactants etc.

Before final curing, a drying step at room temperature or slightly elevated temperature (e.g. up to about 50° C.) may be undertaken.

The actual curing or a precuring can be carried out at room temperature, but preferably by heat treatment at temperatures above 50° C., preferably above 100° C. and particularly preferably at 150° C. or above. The maximum curing temperature depends, inter alia, on the melting point and/or the heat resistance of the substrate, but is generally from 250 to 300° C. With metallic or mineral substrates, however, significantly higher curing temperatures are also possible, e.g. from 400 to 500° C. and above. The curing may, if desired, be carried out in an inert gas atmosphere (e.g. $N_2$, argon), especially if the substrate is easily oxidized. Curing times are generally in the range from minutes to hours, e.g. from 2 to 30 minutes.

Besides conventional curing by heat (e.g. in a circulating air oven) other curing methods may be used, for example photochemical curing (UV-VIS), electron-beam curing, rapid annealing and curing with IR beams or laser beams.

If desired, the composite prepared may also be subjected to a shaping process before curing.

The invention also relates to the use of the abovementioned nanocomposite for the coating and/or consolidation of the abovementioned substrates. The term "consolidation" is intended here to include any measure which is suitable for providing the substrate in consolidated and/or compacted form, and thus includes, for example, impregnation of the substrate with nanocomposite, embedding of the substrate into a matrix of nanocomposite or cementation or binding of substrates or pieces of substrate with nanocomposite. The term "coating" is taken to mean in particular a partial or complete encapsulation of a substrate with a nanocomposite in order to give this substrate, or pieces thereof, particular properties, for example oxidation resistance, flame retardancy, hydrophobic or oleophobic character, hardness, impermeability, or electrical or thermal insulation.

The following examples further illustrate the present invention.

In the following examples, the silica sol employed is an aqueous silica sol from BAYER ("Levasil 300/30") with a solids content of 30% by weight and a particle size of from 7 to 10 nm. The following abbreviations are furthermore used in the examples:
MTEOS =Methyltriethoxysilane
TEOS =Tetraethoxysilane
PTEOS =Phenyltriethoxysilane
ETEOS =Ethyltriethoxysilane

EXAMPLE 1

184 ml of MTEOS and 51.4 ml of TEOS are mixed, and half of this mixture is vigorously stirred with 62.8 ml of silica sol and 1.71 ml of 37% hydrochloric acid. After 5 minutes, the second half of the alkoxide mixture is added to the charge and then stirring is continued for a further 5 minutes. The resultant sol is then subjected to a post-reaction step (standing at room temperature for 15 minutes). The solids content of the sol is 327 g/l.

Before use, about 2.5 ml of water are added to the sol in order to reach a water content of 0.5 mol of water per mole of hydrolysable group.

Carbon fibre cloths are impregnated by padding with the resultant sol and then cured in a number of layers in a hot press for 20 minutes at 140° C., at a pressure of 100 kN. This gives a solid, elastic carbon fibre composite which, because of the inorganic binder, is also heat-resistant. Thus a 10×1 cm strip of this material can be heated for more than 30 minutes with two Bunsen burners without the carbon fibres burning through. In comparison, a fabric strip bound with epoxy resin burns when the flame is applied and falls apart after 10 minutes.

EXAMPLE 2

Aramid cloths are saturated by padding with the binder from Example 1 and then cured in a number of layers in a hot press for 20 minutes at 140° C., at a pressure of 100 kN. This gives a solid, elastic fibre composite having better heat resistance than organically bound aramid fabrics.

EXAMPLE 3

22 g of aluminium powder are mixed with the binder from Example 1, so that 15% by weight of the total solids content consists of binder. The moist material is then charged into a press (diameter 4 cm) and pressed for 30 minutes at a pressure of 50 kN. Curing is carried out in the press at 80° C. for 1 hour.

This gives a moulding, of a metal-glass composite, which can be post-cured thermally up to temperatures of 550° C. and then has the hardness of glass with a high thermal conductivity.

EXAMPLE 4

A binder is prepared by the method of Example 1 by mixing 670 ml of MTEOS and 186 ml of TEOS and dividing the mixture in a ratio 1:1. Half of the mixture is intensively stirred with 192 g of silica sol (SNOWTEX 50 from Nissan Chemicals) and mixed with 4.4 g of concentrated hydrochloric acid. After 5 minutes, the second half of the silane mixture is added.

After a post-reaction phase of 12 hours, the nanocomposite sol is intensively mixed with 10% by volume of water and stirred for a further 5 minutes. Flame black is mixed into this mixture in an amount which gives the binder 20% of the solids content. The material is transferred into a heated press mould (4 cm diameter) and cured for 30 minutes at 140° C. under a pressure of 20 kN.

This gives a solid shaped article of an $SiO_2$-carbon composite, which is mechanically robust up to temperatures of 1000° C.

EXAMPLE 5

Aramid cloths are saturated by padding with the binder from Example 4 and then cured in a number of layers in a hot press for 20 minutes at 140°C., at a pressure of 100 kN.

This gives a fibre composite which is more flexible than the material from Example 2 and which has better heat resistance than organically bound aramid fabrics.

EXAMPLE 6

803 ml of MTEOS and 223 ml of TEOS are mixed and divided in a ratio of 1:1. Half of the silane mixture is intensively stirred with 165 g of $ZrO_2$ sol (NZS-30A from Nissan Chemicals) and 4.4 g of concentrated hydrochloric acid, and mixed, after 5 minutes, with the second half of the silane mixture.

After a post-reaction phase of 12 hours, the binder is intensively mixed with 10% by volume of water and stirred for a further 5 minutes. To the resultant mixture, boron nitride with a mean particle size of 1 μm is added in an amount such that 85% of the total material consists of boron nitride. The resultant material is spread onto a glass plate at a thickness of about 0.5 mm. After drying for 12 hours at room temperature, the layer is removed and sintered at 500° C. as a free-standing body, giving a solid shaped article.

EXAMPLE 7

1. Preparation of the Sol 16.7 ml of silica sol and 0.49 ml of concentrated hydrochloric acid are added to a mixture of 65.4 ml of MTEOS and 18.3 ml of TEOS, with vigorous stirring. After the reaction of the silanes, the sol is cooled in an ice bath and filtered using a glass-fibre filter (Schleicher and Schüll, Rezist 40 GF).

2. Use of the Sol 100 g of glass gall beads are mixed with 20 ml of the abovementioned sol and pressed in a press mould of 12 cm diameter for 5 minutes at a pressure of 4.4 MPa. The moulding is then heated at 80° C. in a circulating air drying cabinet for 8 hours. This gives a shaped article which remains dimensionally stable at a temperature below the melting point of the raw material (the proportion of the glass beads in the shaped article is 6% by weight).

EXAMPLE 8

A cleaned stainless steel plate (1.4301) is dip-coated with a sol prepared as in Example 7, at a drawing rate of 2 mm/s. The substrate is dried in air for 5 minutes and then heated to 600° C. in an $N_2$ atmosphere, at a heating rate of 1 K/minute. This gives a glassy covering of the stainless steel plate, which covering has a thickness of 3 μm. The coated stainless steel plate can be heated in air to a temperature of 500° C. without any discoloration of the plate.

EXAMPLE 9

A cleaned aluminium plate is coated as described in Example 8 and, after drying, held at a temperature of 500° C. in air for 1 hour. This gives a glassy layer having a thickness of 3 μm. The plate coated in this way shows no evolution of gas in concentrated hydrochloric acid, whereas an uncoated plate dissolves with vigorous gas evolution.

EXAMPLE 10

A cleaned stainless steel plate (1.4301) is dip-coated (primer) with a mixture of 2.5 ml of sodium waterglass (37/40) and 47.5 ml of water, and dried at 80° C. The stainless steel plate is then coated as described in Example 8 and, after drying, is heated at 550° C. in air for 1 hour, at a heating rate of 1 K/min. The stainless steel plate coated in this way can be heated in air to a temperature of 500° C. without any discoloration of the plate.

EXAMPLE 11

1. Preparation of Standard Binder A

A flask is charged with 655 g of MTEOS and 191 g TEOS and then 142 g of aqueous silica sol and immediately thereafter 9 ml of $H_2SO_4$ (40% by weight) are added to the resulting mixture with intensive stirring. After about 1 minute of intensive stirring an exothermic reaction sets in (temperature rise to about 60° C.). For aging the dispersion is kept at room temperature overnight or is refluxed for 1 hour to its further use.

2. Preparation of Standard Binder B

A flask is charged with 621 g of MTEOS and 181 g of TEOS and then 185 g of aqueous silica sol ("$_{Levasil}$ 50/50"; $SiO_2$ solids content 50% by weight, produced by BAYER) and immediately thereafter 10.3 ml of $H_2SO_4$ (40% by weight) are added to the resulting mixture with intensive stirring. After about 1 minute of intensive stirring an exothermic reaction sets in (temperature rise to about 60° C.). For aging the dispersion is kept at room temperature overnight or refluxed for 1 hour prior to its further use.

3. Preparation of Standard Binder C

A flask is charged with 463 g of MTEOS, 180 g of TEOS and 128 g of dimethyldiethoxysilane, whereafter 267 g of aqueous silica sol and immediately thereafter 6.06 ml of HCl (37% by weight) are added to the resulting mixture with intensive stirring. After about 1 minute of intensive stirring an exothermic reaction sets in (temperature rise to about 60° C.). The dispersion can be used directly after cooling thereof to room temperature.

EXAMPLE 12

Production of Molded Parts of Rockwool

Standard Binder A (solids content: 35% by weight) is sprayed, by means of a spray gun, onto untreated rockwool which is constantly swirled in a drum mixer. The proportion of binder ranges from 3 to 12% by weight. Following the spraying operation the samples are molded at 150° C. in a heated press at a compression pressure of 0.5 t and a heating time of 20 min and a cooling time of 20 min. Thereby stable molded bodies are obtained.

EXAMPLE 13

Production of Bonded Heat Relief Plates of Perlite 6 g of water are added to 90 g of Standard Binder A having a solids content of 50% by weight and is intensively mixed in a drum mixer with 300 g of perlite (bulk density 5 l). The mixture is molded into plates (15 cm×15 cm×5 cm) in a press. Following their removal from the press, the plates are cured at 150° C. for 1 hour. In contrast to waterglass-bonded plates the heat relief plates thus produced do not show any cracking when subjected to varying temperatures of up to 1000° C.

EXAMPLE 14

Production of High Temperature Aramide Fibre Composites

High modulus aramide fibre fabric (Du Pont, Kevlar, basis weight 110 g/cm$^2$, washed, drill weave) is impregnated in the Standard Binder C. and superimposed in several layers. The layers are pressed together in the liquid sol. The fabric layers bonded to each other are dried in the binder matrix at room temperature for 12 hours. Subsequently the composite is densified at 70° C. for 6 hours and at 130° C. for 4 hours. According to said process high temperature aramide fibre composites having multiple layers can be produced. The composites are characterized by an increased temperature resistance in comparison to epoxide resin-bonded aramide fibre composites.

EXAMPLE 15

Production of High Temperature Carbon Fibre Composites

Carbon fabric ("Tenax", basis weight 93 g/cm$^2$, plain weave, manufactured by AKZO) is impregnated in the Standard Binder C and superimposed in several layers. The layers are pressed together in the liquid sol. The fabric layers bonded to each other are dried in the binder matrix at room temperature for 12 hours. Subsequently the composite is densified at 70° C. for 6 hours and at 130° C. for 4 hours. According to said processes, high temperature carbon fibre composites having multiple layers can be produced. The composites are characterized by a higher temperature resistance in comparison to epoxide resin-bonded carbon fibre composites.

EXAMPLE 16

Production of High Temperature Ceramide Fibre Composites

Silicon carbide fibres ("Nicalon" manufactured by Nippon Carbon) are drawn through a suspension containing Standard Binder C. Following preliminary drying the coated fibres are formed into fibre bundles or monodirectional or multi-directional, respectively, laminates and dried at room temperature for 12 hours. Subsequently, the composites are densified at 60° C. for 6 hours and at 130° C. for 12 hours. According to said process high temperature silicon carbide composites can be produced.

We claim:

1. A method of manufacturing a composite material comprising a substrate that is not a glass or mineral fiber or a vegetable material and a nanocomposite in contact with the substrate, the method comprising the steps of:

(1) preparing a nanocomposite sol by surface modifying colloidal inorganic particles with one or more silanes of the general formula $R_x$—Si—$A_{4-x}$
   where
   each A is the same or different and is selected from hydroxyl and groups that are hydrolytically removable but are not methoxy,
   each R is the same or different and is selected from groups that are not hydrolytically removable, and
   x is 0, 1, 2, or 3,
   where $x \geq 1$ in at least 50 mol % of the silanes; under sol-gel process conditions with a sub-stoichiometric quantity of water ranging from 0.1 to 0.45 mol of water per mol of the hydrolyzable groups present;

(2) activating the nanocomposite sol with a further quantity of water;

(3) contacting the substrate with the activated nanocomposite sol; and (4) curing the contacted substrate, thereby forming the composite material.

2. The method of claim 1 where the step of preparing the nanocomposite sol is carried out in the presence of an acid condensation catalyst at a pH of from 1 to 2.

3. The method of claim 1 where the colloidal inorganic particles are selected from the group consisting of sols and dispersible nanoscale powders of $TiO_2$, $ZrO_2$, $Al_2O_3$, $Y_2O_3$, $CeO_2$, $SnO_2$, ZnO, iron oxides, and carbon.

4. The method of claim 1 where the colloidal inorganic particles comprise from 5% to 60% by weight of the nanocomposite.

5. The method of claim 1 where the silanes, when expressed as polysiloxane of the formula $R_xSiO_{(2-0.5x)}$, comprise from 20% to 95% by weight of the composite.

6. The method of claim 1 where additives are added during preparation of the nanocomposite sol.

7. The method of claim 6 where the additives are selected from the group consisting of curing catalysts, organic binders, pigments, dyes, flame retardants, compounds of glass-forming elements, anti-corrosion agents, and coating aids.

8. The method of claim 6 where the additives comprise not more than 20% by weight of the nanocomposite.

9. The method of claim 1 where the quantity of water used in the step of preparing the nanocomposite sol is from 0.35 to 0.45 mol of water per mol of hydrolyzable groups present.

10. The method of claim 1 where the nanocomposite comprises from 0.1 to 80% by weight of the composite material.

11. The method of claim 1 where the step of curing the contacted substrate comprises thermal curing.

12. The method of claim 11 where the thermal curing is carried out at a temperature between 50° C. and 300° C.

13. The method of claim 1 where the substrate is coated with the nanocomposite.

14. The method of claim 1 where the substrate is consolidated with the nanocomposite.

15. The method of claim 1 where the substrate is a fabric and is impregnated with the nanocomposite.

16. The method of claim 1 which further comprises forming a laminate by sandwiching the composite material between laminate layers.

17. The method of claim 1 where the substrate is selected from the group consisting of metals, metal alloys, nonmetals, glass, ceramics, carbon, oxides, nitrides, carbides, borides, plastics, and minerals.

18. A composite material prepared by the method of claim 1.

19. A composite material prepared by the method of claim 15.

20. A composite material prepared by the method of claim 17.

21. The method of claim 1 where, before the step of contacting the substrate with the activated nanocomposite sol, the activated nanocomposite sol is adjusted in viscosity to 5–500 mPas for the formation of the composite material.

* * * * *